United States Patent
Loos et al.

(10) Patent No.: US 10,126,762 B2
(45) Date of Patent: Nov. 13, 2018

(54) VELOCITY AND PRESSURE EQUALIZATION PORTS

(71) Applicants: Jordan L. Loos, Rockford, IL (US); Mike L. Hahn, Loves Park, IL (US); Steve McLevige, Janesville, WI (US); Brian Lawver, Rockford, IL (US)

(72) Inventors: Jordan L. Loos, Rockford, IL (US); Mike L. Hahn, Loves Park, IL (US); Steve McLevige, Janesville, WI (US); Brian Lawver, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 94 days.

(21) Appl. No.: 15/426,641

(22) Filed: Feb. 7, 2017

(65) Prior Publication Data

US 2018/0224870 A1     Aug. 9, 2018

(51) Int. Cl.
F16K 17/04     (2006.01)
G05D 16/10     (2006.01)

(52) U.S. Cl.
CPC ........... *G05D 16/103* (2013.01); *F16K 17/04* (2013.01)

(58) Field of Classification Search
USPC .................................................... 137/625.33
See application file for complete search history.

(56) References Cited

U.S. PATENT DOCUMENTS

| | | | |
|---|---|---|---|
| 2,305,519 A | 12/1942 | Dunmire | |
| 3,971,411 A * | 7/1976 | Baumann | F16K 1/54 |
| | | | 137/625.3 |
| 4,146,179 A * | 3/1979 | Egli | B05B 1/306 |
| | | | 239/123 |
| 4,422,470 A | 12/1983 | Jackson et al. | |
| 4,838,954 A | 6/1989 | Perach | |
| 5,133,383 A * | 7/1992 | King | E21B 34/02 |
| | | | 137/625.3 |
| 5,433,237 A | 7/1995 | Kao et al. | |
| 6,135,135 A | 10/2000 | Futa, Jr. et al. | |
| 6,328,056 B1 | 12/2001 | Kumar et al. | |
| 6,782,692 B2 | 8/2004 | Hodinot et al. | |
| 7,770,595 B2 | 8/2010 | Kirchner et al. | |
| 8,205,636 B2 | 6/2012 | Kuromusha | |
| 8,347,620 B2 | 1/2013 | Yu et al. | |
| 8,469,053 B2 | 6/2013 | Kirchner et al. | |
| 8,967,195 B2 | 3/2015 | Williamson et al. | |
| 9,249,800 B2 | 2/2016 | Ballard et al. | |

(Continued)

FOREIGN PATENT DOCUMENTS

EP     3115667 A1     1/2017

Primary Examiner — John Fox
(74) Attorney, Agent, or Firm — Reinhart Boerner Van Deuren P.C.

(57) ABSTRACT

A bypass flow valve is provided. The bypass flow valve includes a valve piston and a first annulus disposed on a first end of the valve piston. The first annulus has an inlet and an outlet and surrounds a first valve sleeve. The first valve sleeve contains an arrangement of a first plurality of ports providing fluid communication to the valve piston. The arrangement of the first plurality of ports includes a first region of the first valve sleeve in line with the inlet of the first annulus and a second region of the first valve sleeve in line with the outlet of the first annulus. The second region has fewer ports than the first region.

19 Claims, 5 Drawing Sheets

(56) References Cited

U.S. PATENT DOCUMENTS

| | | |
|---|---|---|
| 9,383,035 B2 | 7/2016 | Kirchner et al. |
| 2007/0272315 A1* | 11/2007 | Lewis .................. F02C 9/263 137/625.3 |
| 2010/0037961 A1 | 2/2010 | Tysver et al. |
| 2014/0158227 A1 | 6/2014 | Richis et al. |
| 2015/0068620 A1 | 3/2015 | Lemmers, Jr. et al. |
| 2015/0252913 A1 | 9/2015 | Yamamoto |

* cited by examiner

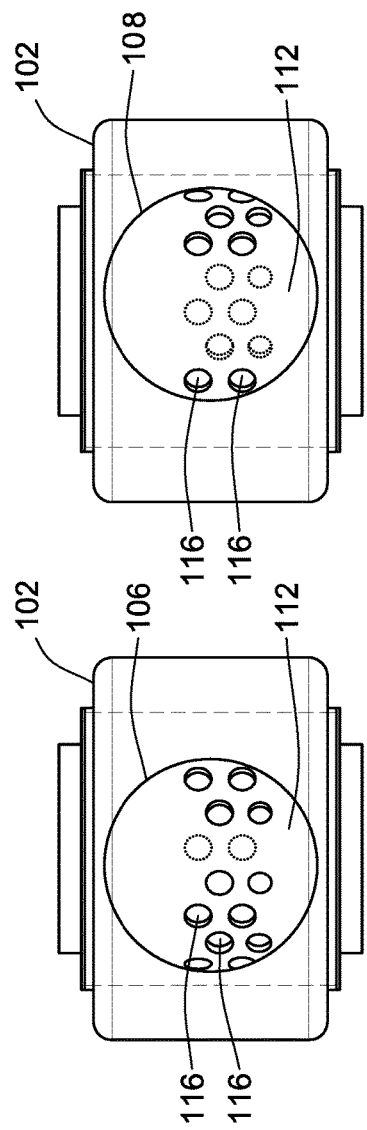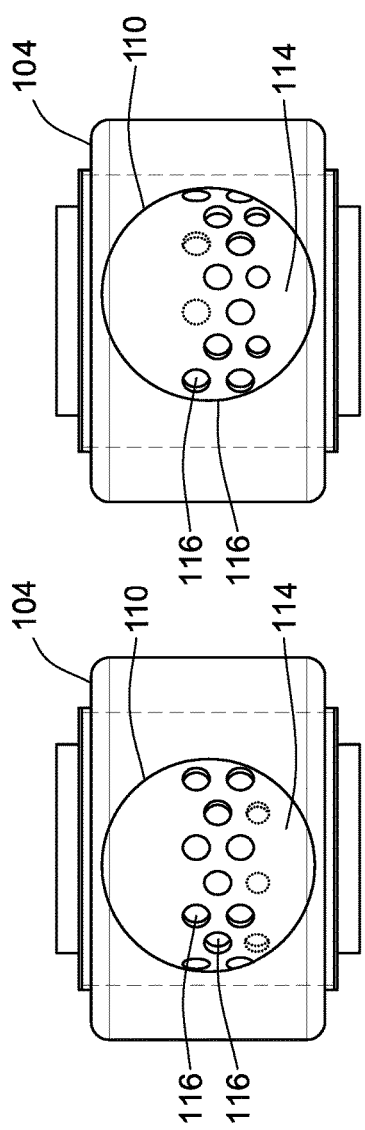

VELOCITY AND PRESSURE EQUALIZATION PORTS

FIELD OF THE INVENTION

This invention generally relates to fluid flow valves and more particularly to an improvement to fluid flow valves with an imbalance of radial loading.

BACKGROUND OF THE INVENTION

A bypass valve can be used to maintain a constant pressure drop across the inlet and outlet of a metering valve, such as a metering valve that forms a part of a fluid pressure system. Generally, a bypass valve comprises a valve piston adapted to reciprocate within a valve sleeve. The bypass valve references the differential pressure across the metering valve. The force due to the differential pressure is countered by a linear compression spring. This results in proportionality between the metering valve's differential pressure and the bypass valve's position. The valve sleeve also includes a low pressure bypass outlet port for bypassing excess fluid from the high pressure side of the system to a bypass line back to the inlet of a positive displacement pump.

An increase in the pressure upstream of the metering valve or a decrease in the pressure downstream of the metering valve will tend to open the bypass return port. A decrease in the pressure upstream of the metering valve or an increase in the pressure downstream of the metering valve will tend to close the bypass return port. Thus the bypass valve adjusts the flow returned to the high pressure pump to maintain a constant differential across the metering valve.

As metered flow travels around the bypass valve and as returned flow enters and exits the bypass valve, radial loads are imparted on the valve piston. The radial loads are influenced by such factors as the geometry of the valve piston, the geometry of the valve sleeve, the flow patterns of both the metered and returned flow paths, and the varying velocity and pressure levels of the fluid within the bypass valve sleeve. The resultant piston side loads negatively impact the steady state as well as the dynamic performance of the bypass valve.

New developments in engine design have been accompanied by a demand for increased fuel flow and higher temperature and pressure levels. These changes in fuel system boundaries create a broader and more severe environment which system hardware, including such components as bypass valves, must dynamically respond without degrading. In particular, the changes in bypass valve environmental conditions create a higher likelihood for elevated friction as a result of broad pressure and flow ranges and the increase in valve size to accommodate these broad flow and pressure ranges.

BRIEF SUMMARY OF THE INVENTION

In one aspect, embodiments of a fluid flow valve are provided. The fluid flow valve includes a valve piston and a first annulus disposed on a first end of the valve piston. The first annulus has an inlet. The fluid flow valve also includes a first valve sleeve that contains a first plurality of ports spanning a first distance around a periphery of the first valve sleeve. The first valve sleeve also contains a second plurality of ports spanning a second distance around the periphery of the first valve sleeve. The first plurality of ports and the second plurality of ports provide fluid communication to the valve piston. A first space having no ports separates the first plurality of ports from the second plurality of ports, and the first space is in line with the inlet of the first annulus.

In embodiments of the fluid flow valve, the first annulus further includes an outlet, and a second space having no ports separates the first plurality of ports and the second plurality of ports. The second space can be in line with the outlet of the first annulus. In certain embodiments, the second space is larger than the first space.

In some embodiments, the inlet and outlet of the first annulus are separated by 180°. In such embodiments, a resultant side loading vector on the valve piston when exposed to flowing fluid is at an angle of between 45° and 135° or between 225° and 315° relative to the outlet of the first annulus being at 0°.

In other embodiments, of the fluid flow valve, the first plurality of ports and the second plurality of ports have an arrangement that is adapted from a hypothetical symmetric pattern of ports. In particular, the hypothetical symmetric pattern of ports can include a first number of vertically arranged pairs of ports in which adjacent pairs of ports are vertically offset from each other and in which the pairs of ports are evenly spaced around the periphery of the first valve sleeve. The first space having no ports is produced by removing a second number of vertically arranged pair of ports in line with the inlet of the first annulus and the second space having no ports is produced by removing a third number of adjacent vertically arranged pairs of ports in line with the outlet of the first annulus. In embodiments, the arrangement of the first plurality of ports and of the second plurality of ports defines a total port area that is between 5% and 30% less total port area than that of the hypothetical symmetric pattern of ports. In certain embodiments, the first number is at least twenty, the second number is one, and the third number is three.

In still other embodiments, the fluid flow valve also includes a second annulus disposed on a second end of the valve piston. The annulus has an outlet and surrounds a second valve sleeve. The second valve sleeve contains an arrangement of a third plurality of ports providing fluid communication to the valve piston. The arrangement of the third plurality of ports includes a first region of the second valve sleeve in line with the outlet of the second annulus and a second region of the second valve sleeve that is opposite the first region. The first region has fewer ports than the second region. In such embodiments, the outlet of the second annulus can be oriented perpendicular to both the inlet and outlet of the first annulus and wherein a resultant side loading vector on the valve piston when exposed to flowing fluid is at an angle of between 155° and 205° or between 25° and 335° relative to the outlet of the first annulus being at 0°.

In still other embodiments, the arrangement of the second plurality of ports is adapted from a hypothetical symmetric pattern. Further, the hypothetical symmetric pattern includes a first number of vertically arranged pairs of ports in which adjacent pairs of ports are vertically offset from each other and in which the pairs of ports are evenly spaced around the periphery of the second valve sleeve. Still further, the arrangement of the second plurality of ports is produced by removing a second number of ports in line with the outlet of the second annulus such that the arrangement of the second plurality of ports has between 2% and 20% less total port area than the hypothetical symmetric pattern.

In a specific embodiment, the second number is three, and the three ports are three bottom ports of first, second, and third vertically arranged pairs of ports. Moreover, a vertically arranged pair of ports separates the first and second vertically arranged pairs of ports with the bottom ports removed, and another vertically arranged pair of ports separates the second and third vertically arranged pairs of ports with the bottom ports removed. In another specific embodiment, the second number is two, and the two ports are two top ports of first and second vertically arranged pairs of ports. Further, a vertically arranged pair of ports separates the first and second vertically arranged pairs of ports with the top ports removed.

In another aspect, embodiments of a method of reducing the side loading on a valve piston are provided. The method includes the step of flowing a fluid through a first annulus that surrounds a first valve sleeve such that the fluid flows from an inlet side to an outlet side of the first annulus. The first valve sleeve further surrounds the valve piston, and the first valve sleeve includes a first plurality of ports that provide fluid communication from the first annulus to the valve piston. The method also includes the steps of preventing fluid from flowing through a first region of the first valve sleeve in line with the inlet and preventing fluid from flowing through a second region of the first valve sleeve in line with the outlet. The second region is larger in area than the first region.

In such embodiment of the method, the inlet and outlet of the first annulus are separated by 180°. Further, a resultant side loading vector on the valve piston when exposed to flowing fluid can be at an angle of between 45° and 135° or between 225° and 315° relative to the outlet of the first annulus being at 0°.

In a specific embodiment, the method includes the additional steps of bypassing at least a portion of the fluid from the first end of the valve piston to a second end of the valve piston. The method also includes a step of flowing the bypassed fluid out of the second end of the valve piston through a second valve sleeve that is surrounded by a second annulus having an outlet. In doing so, fluid is prevented from flowing through a region of the second valve sleeve that is in line with the outlet of the second annulus. Further, the outlet of the second annulus can be oriented perpendicular to both the inlet and outlet of the first annulus such that a resultant side loading vector on the valve piston when exposed to flowing fluid can be at an angle of between 155° and 205° or between 25° and 335° relative to the outlet of the first annulus being at 0°.

In still another aspect, other embodiments of a fluid flow control valve are provided. The fluid flow control valve includes a valve piston and a first annulus disposed on a first end of the valve piston. The first annulus has an inlet and an outlet, and the first annulus surrounding a first valve sleeve. The first valve sleeve containing an interrupted circumferential port pattern. The interrupted circumferential port pattern includes a first interruption in line with the inlet of the first annulus and a second interruption in line with the outlet of the first annulus. In certain embodiments, the second interruption is larger than the first interruption. Additionally, the fluid flow control valve can include a second annulus disposed on a second end of the valve piston. The second annulus has an outlet and surrounds a second valve sleeve. The second valve sleeve contains an interrupted circumferential port pattern. The interrupted circumferential port pattern includes an interruption in line with the outlet of the second annulus.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 4A and 4B depict a high pressure valve sleeve for the high pressure annulus from the inlet side and the outlet side, respectively, according to an exemplary embodiment;

FIGS. 6A-6B depict exemplary embodiments of the low pressure valve sleeve for the low pressure annulus.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of a fluid flow valve disclosed herein have improved dynamic response to changes in the fluid flow demands of a flow system. The aspects of the disclosed improvements can be applied to a variety of different fluid flow valves, including, for example, a bypass valve, a pressure regulating valve, flow regulating valve, throttle valve, and spill valve. Exemplary embodiments of the fluid flow valve are described herein in relation to a bypass valve; however, a person having ordinary skill in the art will recognize from this disclosure that the improvements can be applied to other fluid flow valves.

According to embodiments disclosed herein, the exemplary bypass valve's dynamic response is improved through a reduction in the magnitude and a redirection of side loading on the valve piston in the bypass valve. Reducing the magnitude and redirecting side loading of the valve piston is accomplished by using an asymmetric port pattern on the valve sleeve of the bypass valve. Advantageously, embodiments of the bypass valves disclosed herein have enhanced insensitivity to valve clocking and reduced radial loads on the valve piston. Because of the particular applicability to fuel systems, embodiments of the bypass valve disclosed herein will be described in this context; however, the embodiments disclosed herein are not limited to this context.

Figure 1:
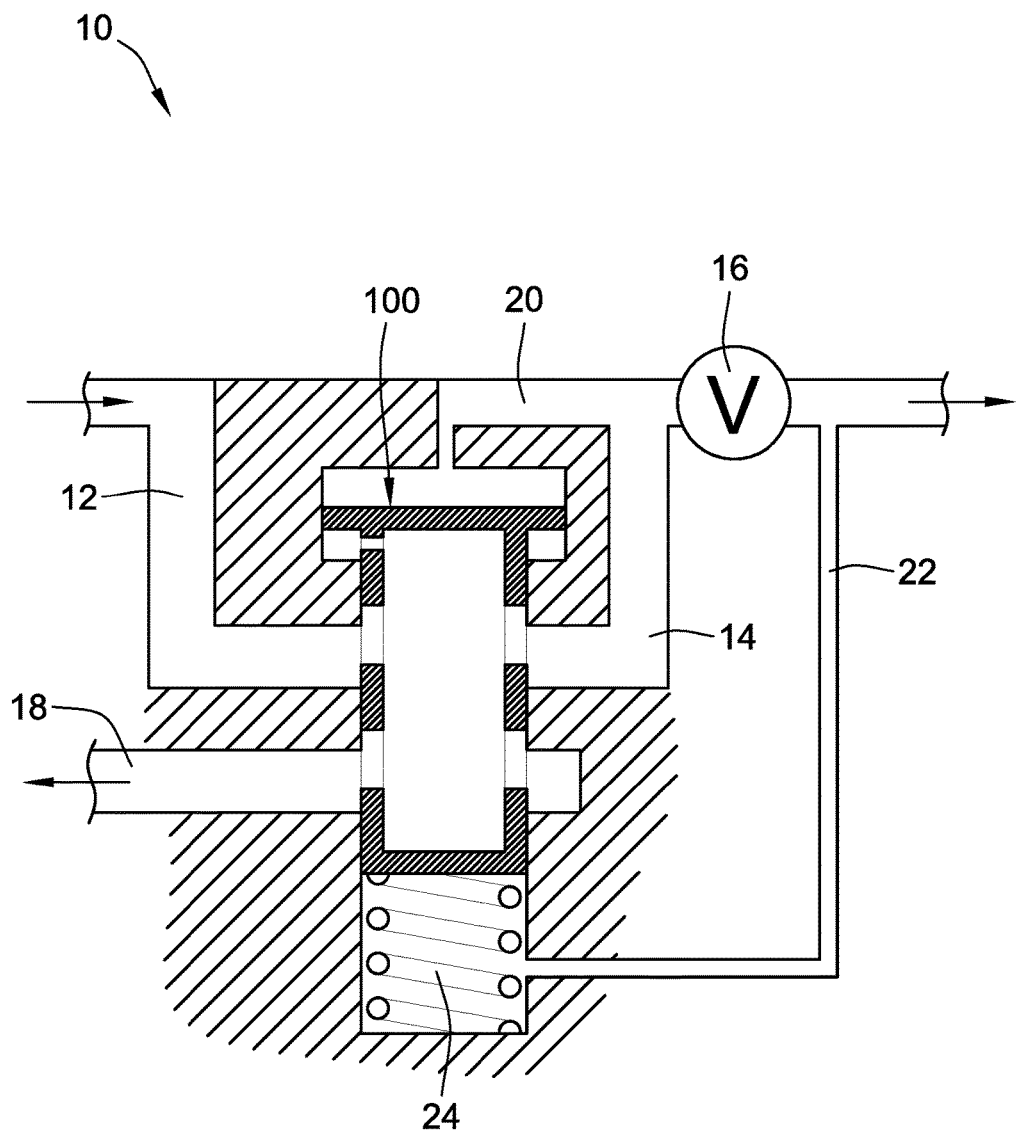
FIG. 1 depicts a schematic illustration of an exemplary fluid flow system including a bypass valve according to an exemplary embodiment.

FIG. 1 depicts a schematic illustration of an exemplary fluid flow system, such as a fuel system 10, containing a bypass valve 100. As can be seen in FIG. 1, high pressure fuel enters the fuel system 10 via an inlet line 12. Fuel is provided to the high pressure line 12 from a fuel supply, such as a fuel tank (not shown), through a pressurizing means, such as a fuel pump (not shown). From the inlet line 12, the fuel enters the bypass valve 100, and a portion of the fuel exits the bypass valve 100 through outlet line 14 and is transported to a downstream metering valve 16. The metering valve 16 provides metered fuel to an engine (not shown), and the bypass valve 100 is used to maintain a constant pressure drop across the inlet and outlet of a metering valve 16. Another portion of the fuel in the bypass valve 100 is returned to the fuel tank via a bypass line 18. The amount of fuel bypassed back to the fuel tank is based in part on pressure feedback lines 20, 22 upstream and downstream of the metering valve 16 and also in part on a spring 24 that biases the bypass valve 100 closed. An exemplary fuel system is disclosed in U.S. Pat. No. 5,433,237, filed on Jul. 11, 1994, issued on Jul. 18, 1995, and owned by a common assignee to this invention, and which is incorporated by reference in its entirety herein.

Figure 2:
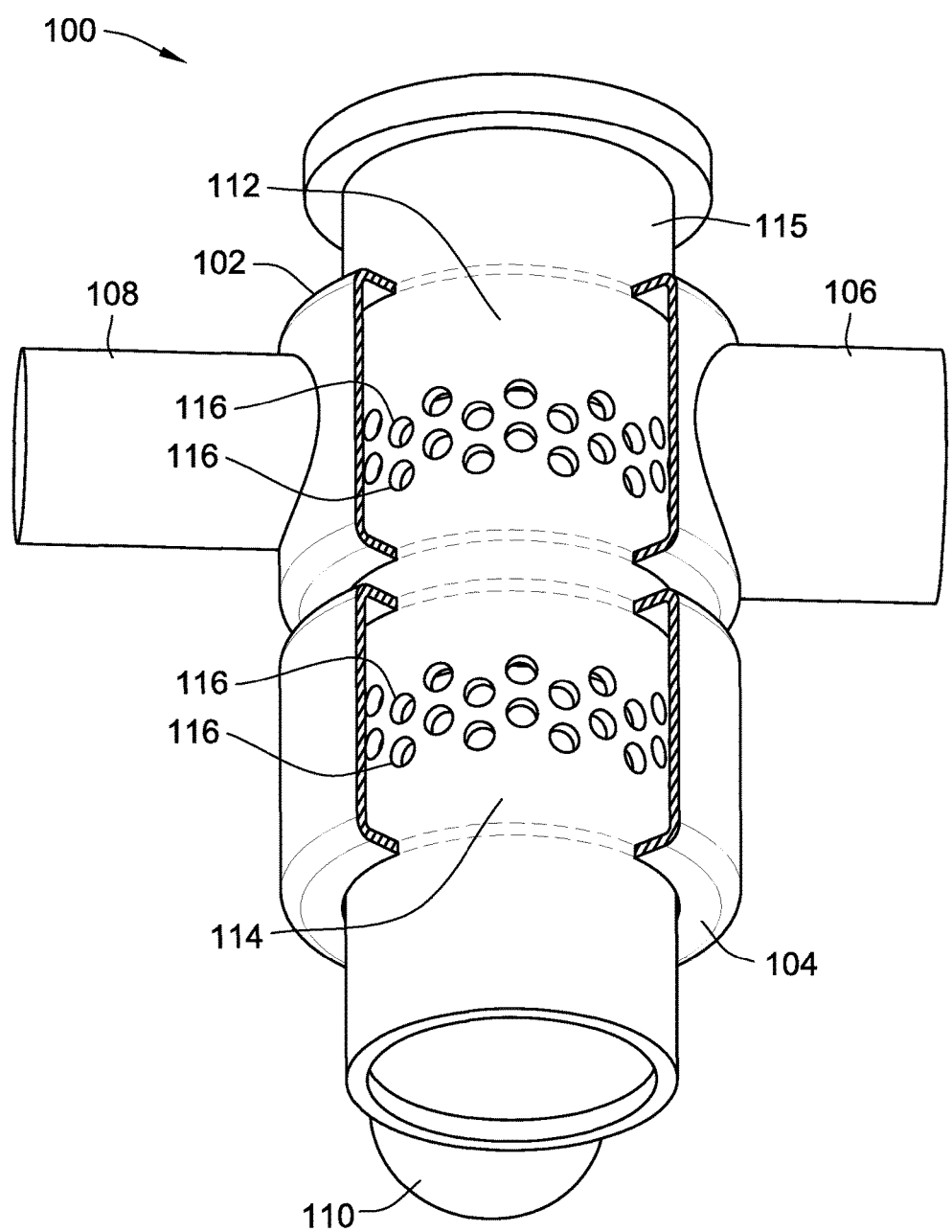
FIG. 2 depicts a bypass valve according to an exemplary embodiment.

An actual depiction of an embodiment of the bypass valve 100 shown schematically in FIG. 1 is provided in FIG. 2. The bypass valve 100 includes a high pressure annulus 102 and a low pressure annulus 104. Fluid flows into the high pressure annulus 102 through a high pressure inlet 106 and out of the high pressure annulus 102 through a high pressure outlet 108. In certain embodiments, the high pressure annulus 102 does not contain an outlet 108. In such embodiments, the bypass valve 100 does not supply fuel to the metering valve 16 (as shown in FIG. 1) but instead the inlet line 12 is connected directly to the metering valve 16. In which case, a separate line bypasses fluid from inlet line 12 to the bypass valve 100. Such an alternative bypass valve arrangement is provided in the '237 patent referenced above, which has been incorporated herein in its entirety by reference.

Returning to the embodiment depicted in FIG. 2, the low pressure annulus 104 includes a low pressure outlet 110 for bypass fluid flow. A high pressure valve sleeve 112 forms the interior wall of high pressure annulus 102, and a low pressure valve sleeve 114 forms the interior wall of the low pressure annulus 104. The high pressure valve sleeve 112 and the low pressure valve sleeve 114 form a valve housing 115. The high pressure valve sleeve 112 and the low pressure valve sleeve 114 both include a plurality of ports 116 around their peripheries. The size, shape, and pattern of ports can vary. As depicted in FIG. 2, the ports 116 are circular and are generally arranged around the periphery of the high and low pressure valve sleeves 112, 114 in vertical pairs offset from adjacent vertical pairs. As will be discussed in more detail below, the pattern of ports 116 is disrupted in certain regions around the high and low pressure valve sleeves 112, 114 to affect the flow of fluid in the annuli 102, 104.

Figure 3:
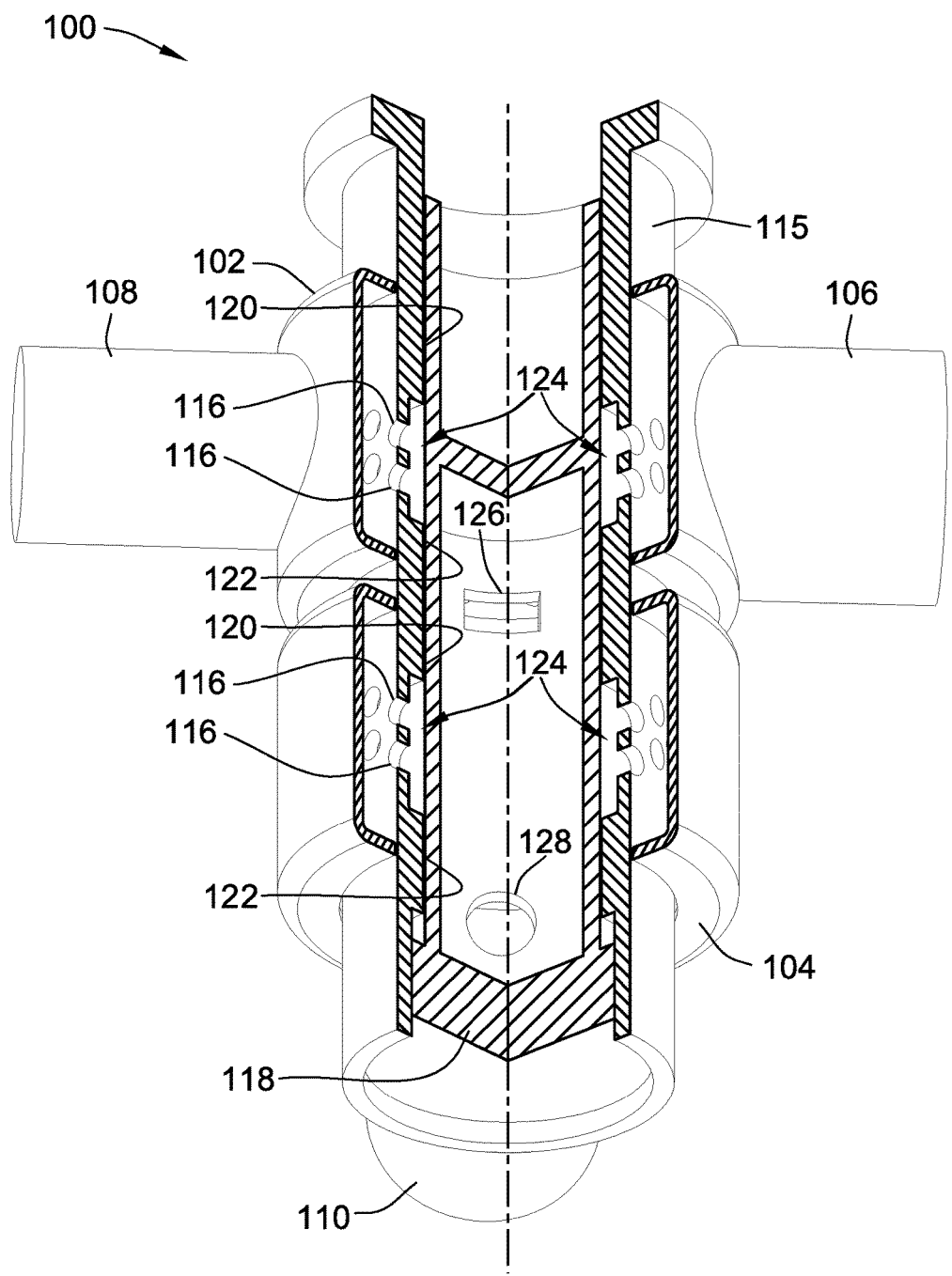
FIG. 3 depicts a cross-sectional view of the bypass valve of FIG. 2.

The valve housing 115, including the high pressure valve sleeve 112 and the low pressure valve sleeve 114, surrounds a valve piston 118 as can be seen in FIG. 3. In particular, the high pressure valve sleeve 112 and the low pressure valve sleeve 114 each include an upper abutment region 120 and a lower abutment region 122 that contact the valve piston 118. In exemplary embodiments, the upper abutment region 120 of high pressure valve sleeve 112 and the lower abutment region 122 of the low pressure valve sleeve 114 can be a continuous abutment region as shown in FIG. 3. The area that does not contact the valve piston 118 between the upper abutment region 120 and the lower abutment region 122 defines an annular cavity 124 between the valve piston 118 and each of the high pressure valve sleeve 112 and the low pressure valve sleeve 114.

As is also depicted in FIG. 3, the valve piston 118 includes a plurality of inlet windows 126 and outlet windows 128. The inlet windows 126 permit fluid flow into the interior of the valve piston 118, and the outlet windows 128 permit fluid flow out of the interior of the valve piston 118. The valve piston 118 is in slidable relationship with the valve housing 115 such that the inlet windows 126 and outlet windows 128 have varying degrees of overlap with the lower abutment regions 122 of the high pressure valve sleeve 112 and low pressure valve sleeve 114, respectively. In this way, the amount of fluid entering and exiting the interior of the valve piston 118 is varied based on the degree of overlap between the inlet windows 126 and the outlet windows 128 and the lower abutment regions 122. The size, shape, and number of inlet windows 126 and outlet windows 128 can vary.

Fluid enters the inlet 106 of the high pressure annulus 102 and fills the high pressure annulus 102. A portion of fluid flows out of the high pressure annulus 102 through the outlet 108. Another portion of fluid flows through the plurality of ports 116 of the high pressure valve sleeve 112 into the annular cavity 124 between the high pressure valve sleeve 112 and the valve piston 118. From the annular cavity 124, fluid flows into the inlet windows 126 into the interior of the valve piston 118. The fluid then flows out of the valve piston 118 through the outlet windows 128 into the annular cavity 124 of the low pressure valve sleeve 114. From the annular cavity 124, fluid flows out of the plurality of ports 116 in the low pressure valve sleeve 114 into the low pressure annulus 104, and the fluid exits the low pressure annulus 104 through the low pressure outlet 110.

The flow of fluid in the annuli 102, 104 creates radial loading on the valve piston 118. The radial loading tends to be unbalanced such that valve piston 118 experiences a net loading in the direction of the high pressure inlet 106 in the high pressure annulus 102 and in the direction of the low pressure outlet 110 (as shown in FIG. 2) in the low pressure annulus 104. Herein, the net loading from the unbalanced radial loading is referred to as "side loading." The side loading creates frictional forces between the valve piston 118 and the valve housing 115, which, but for the design described below, would affect the dynamic performance of the valve.

In order to address the side loading on the valve piston 118, the plurality of ports 116 on the high and low pressure valve sleeves 112, 114 were configured to reduce the magnitude and to change the direction of the loading on the valve piston 118. As mentioned above, certain regions around the high and low pressure valve sleeves 112, 114 are devoid of ports 116, i.e., the flow path through these regions are blocked. In describing an embodiment of the bypass valve 100 including these regions, reference will be made to the above-described pattern in which the ports 116 are circular and are arranged around the periphery of the high and low pressure valve sleeves 112, 114 in vertical pairs offset from adjacent vertical pairs. The pattern is generally symmetric around the circumference of the valve sleeves 112, 114. When referring to blocked flow paths, reference will be made to the removal of ports 116 from this basic pattern for ease of discussion (although the ports are not actually "removed" but instead are simply not formed into the high and low pressure valve sleeves 112, 114). Additionally, the modifications to the symmetrical port pattern may also be described as interruptions to the symmetrical port pattern. Further still, the pattern of ports 116 can be considered groups of ports 116 that are separated by a space. For example, the ports 116 between the inlet 106 and the outlet 108 on each side of the high pressure valve sleeve 112 correspond to a first plurality of ports 116 and a second plurality of ports 116. These pluralities of ports 116 are thus separated by a first space having no ports in line with the inlet 106 and a second space having no ports in line with the outlet 108.

FIGS. 4A and 4B depict the high pressure valve sleeve 112 in the high pressure annulus 102. As can be seen in FIGS. 4A and 4B, several ports 116 have been removed (as denoted by the dotted lines) from the pattern of ports 116. In embodiments, more ports 116 are removed on the outlet 108 side of the high pressure valve sleeve 112 (FIG. 4B) than on the inlet 106 side (FIG. 4A). Preferably, the total amount of ports 116 removed from the entire periphery of the high pressure valve sleeve 112 is between 5% and 30% of the total port area 116 contained on the high pressure valve sleeve 112. In the particular embodiment depicted in FIGS. 4A and 4B, which has twenty-four pairs of ports 116 in the symmetric arrangement, two ports have been removed in line with the high pressure inlet 106 (FIG. 4A) and six ports have been removed in line with the high pressure outlet 108 (FIG. 4B).

Figure 5:
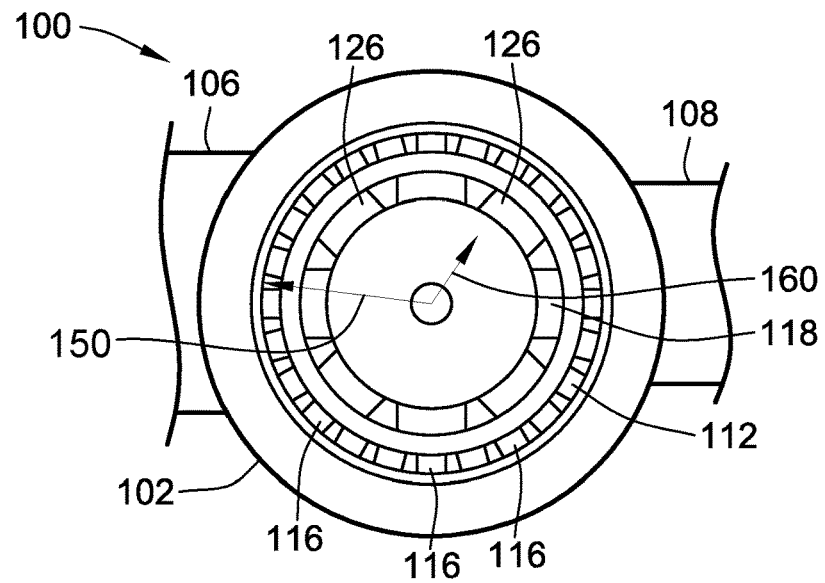
FIG. 5 is a representation of a resultant load vector in the high pressure annulus for a bypass valve using the high pressure valve sleeve of FIG. 4 as compared to the resultant load vector of a symmetric valve sleeve port arrangement.

Through computational fluid dynamics (CFD) analysis, the direction and magnitude of radial loading on the valve piston were investigated for a particular flow condition both before removal of the ports (axis symmetric sleeveport pattern) and after removal of the ports (axis asymmetric or interrupted sleeve port pattern) to determine the effect on velocity and pressure symmetric gradients at the high pressure inlet and high pressure outlet. As shown in FIG. 5, the axis symmetric sleeve port pattern produced side loading in the direction of the inlet flow. In particular, the resultant symmetric radial load vector 150 in the high pressure annulus 102 was 0.78 lbf at 168°. The side loading can be explained, in part, by the differential in velocities entering and leaving the high pressure annulus 102. In particular, the velocity of the fluid leaving the high pressure annulus 102 through the outlet 108 is greater than the velocity entering the high pressure annulus 102 through the inlet 106. The difference in velocity causes a pressure load acting on the valve in the direction of the inlet as shown by the symmetric radial load vector 150.

FIG. 5 also depicts a resultant asymmetric radial load vector 160 for the asymmetric sleeve port pattern in which ports in line with the high pressure inlet 106 and in line with the high pressure outlet 108 have been removed from the sleeve port pattern. The resultant asymmetric radial load vector was 0.43 lbf at 70°. Thus, not only was the magnitude of the side loading reduced but the direction of side loading was also changed.

Similarly, the low pressure valve sleeve 114 was modified to have an asymmetric pattern as shown in FIGS. 6A and 6B. In particular, FIG. 6A shows a first exemplary modification of the low pressure valve sleeve 114, and FIG. 6B shows a second exemplary modification of the low pressure valve sleeve 114. Both FIGS. 6A and 6B consider modifications to a symmetric pattern of ports 116 featuring twenty-four pairs of ports around the periphery of the low pressure valve sleeve 114. In embodiments, the total surface area of the ports 116 is reduced by between 2% and 20%.

Referring first to FIG. 6A, the low pressure valve sleeve 114 has been modified to remove three ports (as denoted by the dotted lines) on the side of the low pressure valve sleeve 112 facing the outlet 110 of the low pressure annulus 104. The three ports that are removed are all the bottom ports of three pairs of vertically arranged ports. Additionally, the pairs of ports from which they were removed are separated by a complete pair of vertically arranged ports, i.e., in the up-and-down, zigzag pattern of ports 116, the bottom ports of three consecutive "down" pairs were removed. FIG. 6B shows an alternate modification of the low pressure valve sleeve 114 in which the top ports of two consecutive "up" pairs were removed on the side of the low pressure valve sleeve 114 facing the outlet 110 of the low pressure annulus 104.

Figure 7:
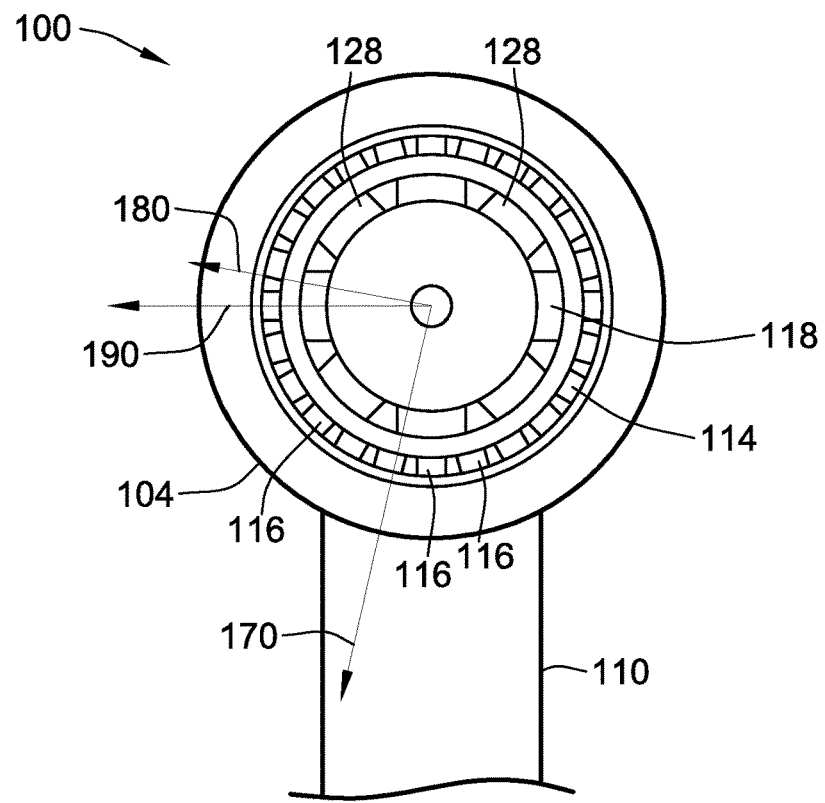
FIG. 7 is a representation of resultant load vectors in the low pressure annulus for a bypass valve using the low pressure valve sleeves of FIGS. 6A-6B as compared to the resultant load vector of a symmetric valve sleeve port arrangement.

As shown in FIG. 7, the axis symmetric sleeve hole pattern produced side loading in the direction of the outlet 110 of the low pressure annulus 104. In particular, the resultant symmetric radial load vector 170 in the low pressure annulus 104 was 3.1 lbf at 263°. The side loading is, at least in part, a result of the velocity of the fluid leaving the low pressure annulus 104 into a large volume (i.e., the outlet 110) on one side of the low pressure valve sleeve 114 while, on the opposing side, the fluid is jetted into the wall of the low pressure annulus 104. This creates a differential in pressure, which causes side loading of the valve piston 118 in the direction of the low pressure outlet 110. FIG. 7 also shows the first resultant asymmetric radial load vector 180 for the low pressure valve sleeve 114 shown in FIG. 6A and the second resultant radial load vector 190 for the low pressure valve sleeve 114 shown in FIG. 6B. The first resultant asymmetric radial load vector 180 was 1.2 lbf at 162°, and the second resultant asymmetric radial load vector 190 was 1.4 lbf at 176°. Thus, as with the high pressure valve sleeve 112 of the high pressure annulus (shown in FIG. 5), the two modifications of the low pressure valve sleeve 114 both redirect and reduce the magnitude of side loading on the valve piston 118.

The above-described modifications in the high and low pressure valve sleeves 112, 114 in which the ports 116 are arranged in an asymmetric pattern alter the radial loading vectors 160, 180, 190 in favorable ways to reduce net radial loads or redirect loading vectors for a bypass valve 100, thereby allowing for an improvement in dynamic response. Further, optimization of the high and low pressure valve sleeves 112, 114 leads to a more symmetric pressure gradient acting on the valve piston 118. In this way, the bypass valve 100 can be made insensitive to piston orientation.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid flow valve, comprising:
    a valve piston;
    a first annulus, the first annulus disposed on a first end of the valve piston and having an inlet;
    a first valve sleeve, the first valve sleeve containing a first plurality of ports spanning a first distance around a periphery of the first valve sleeve and a second plurality of ports spanning a second distance around the periphery of the first valve sleeve, the first plurality of ports and the second plurality of ports providing fluid communication to the valve piston;
    wherein a first space having no ports separates the first plurality of ports from the second plurality of ports;
    wherein the first space is in line with the inlet of the first annulus; and
    wherein the first annulus further comprises an outlet, wherein a second space having no ports separates the first plurality of ports and the second plurality of ports, and wherein the second space is in line with the outlet of the first annulus.

2. The fluid flow valve of claim 1, wherein the second space is larger than the first space.

3. The fluid flow valve of claim 1, wherein the inlet and outlet of the first annulus are separated by 180°.

4. The fluid flow valve of claim 3, wherein a resultant side loading vector on the valve piston when exposed to flowing fluid is at an angle of between 45° and 135° or between 225° and 315° relative to the outlet of the first annulus being at 0°.

5. The fluid flow valve of claim 1, wherein the first plurality of ports and the second plurality of ports have an arrangement that is adapted from a hypothetical symmetric pattern of ports;
    wherein the hypothetical symmetric pattern of ports includes a first number of vertically arranged pairs of ports in which adjacent pairs of ports are vertically offset from each other and in which the pairs of ports are evenly spaced around the periphery of the first valve sleeve;
    wherein the first space having no ports is produced by removing a second number of vertically arranged pair of ports in line with the inlet of the first annulus and the second space having no ports is produced by removing third number of adjacent vertically arranged pairs of ports in line with the outlet of the first annulus; and
    wherein the arrangement of the first plurality of ports and of the second plurality of ports defines a total port area that is between 5% and 30% less total port area than that of the hypothetical symmetric pattern of ports.

6. The fluid flow valve of claim 5, wherein the first number is at least twenty, the second number is one, and the third number is three.

7. The fluid flow valve of claim 1, further comprising a second annulus disposed on a second end of the valve piston and that has an outlet, the second annulus surrounding a second valve sleeve, the second valve sleeve containing an arrangement of a third plurality of ports providing fluid communication to the valve piston;
    wherein the arrangement of the third plurality of ports includes a first region of the second valve sleeve in line with the outlet of the second annulus and a second region of the second valve sleeve that is opposite the first region, and wherein the first region has fewer ports than the second region.

8. The fluid flow valve of claim 7, wherein the outlet of the second annulus is oriented perpendicular to both the inlet and outlet of the first annulus and wherein a resultant side loading vector on the valve piston when exposed to flowing fluid is at an angle of between 155° and 205° or between 25° and 335° relative to the outlet of the first annulus being at 0°.

9. The fluid flow valve of claim 7, wherein the arrangement of the third plurality of ports is adapted from a hypothetical symmetric pattern;
    wherein the hypothetical symmetric pattern includes a first number of vertically arranged pairs of ports in which adjacent pairs of ports are vertically offset from each other and in which the pairs of ports are evenly spaced around the periphery of the second valve sleeve;
    wherein the arrangement of the third plurality of ports is produced by removing a second number of ports in line with the outlet of the second annulus such that the arrangement of the third plurality of ports has between 2% and 20% less total port area than the hypothetical symmetric pattern.

10. The fluid flow valve of claim 9, wherein the second number is three, wherein the three ports are three bottom ports of first, second, and third vertically arranged pairs of ports, and wherein a vertically arranged pair of ports separates the first and second vertically arranged pairs of ports with the bottom ports removed and another vertically arranged pair of ports separates the second and third vertically arranged pairs of ports with the bottom ports removed.

11. The fluid flow valve of claim 9, wherein the second number is two, wherein the two ports are two top ports of first and second vertically arranged pairs of ports, and wherein a vertically arranged pair of ports separates the first and second vertically arranged pairs of ports with the top ports removed.

12. A method of reducing the side loading on a valve piston, comprising the steps of:
    flowing a fluid through a first annulus that surrounds a first valve sleeve such that the fluid flows from an inlet side to an outlet side of the first annulus, wherein the first valve sleeve further surrounds the valve piston and wherein the first valve sleeve includes a first plurality of ports that provide fluid communication from the first annulus to the valve piston;
    preventing fluid from flowing through a first region of the first valve sleeve, wherein the first region is in line with the inlet; and
    preventing fluid from flowing through a second region of the first valve sleeve, wherein the second region is in line with the outlet and wherein the second region is larger in area than the first region.

13. The method of claim 12, wherein flowing a fluid through the first annulus comprises flowing a fluid through the first annulus in which the inlet and outlet of the first annulus are separated by 180°.

14. The method of claim 13, further comprising the step of producing a resultant side loading vector on the valve piston when exposed to flowing fluid is at an angle of between 45° and 135° or between 225° and 315° relative to the outlet of the first annulus being at 0°.

15. The method of claim 12, further comprising the steps of:
bypassing at least a portion of the fluid from the first end of the valve piston to a second end of the valve piston;
flowing the bypassed fluid out of the second end of a valve piston through a second valve sleeve that is surrounded by a second annulus having an outlet; and
preventing fluid from flowing through a region of the second valve sleeve, wherein the region is in line with the outlet of the second annulus.

16. The method of claim 15, further comprising the step of producing a resultant side loading vector on the valve piston when exposed to flowing fluid is at an angle of between 155° and 205° or between 25° and 335° relative to the outlet of the first annulus being at 0° when the outlet of the second annulus is oriented perpendicular to both the inlet and outlet of the first annulus.

17. A fluid flow control valve, comprising:
a valve piston;
a first annulus disposed on a first end of the valve piston and that has an inlet and an outlet, the first annulus surrounding a first valve sleeve, the first valve sleeve containing an interrupted circumferential port pattern;
wherein the interrupted circumferential port pattern includes a first interruption in line with the inlet of the first annulus and a second interruption in line with the outlet of the first annulus.

18. The fluid flow control valve of claim 17, wherein the second interruption is larger than the first interruption.

19. The fluid flow control valve of claim 17, further comprising a second annulus disposed on a second end of the valve piston and that has an outlet, the second annulus surrounding a second valve sleeve, the second valve sleeve containing an interrupted circumferential port pattern;
wherein the interrupted circumferential port pattern includes an interruption in line with the outlet of the second annulus.

* * * * *